Figure 1:
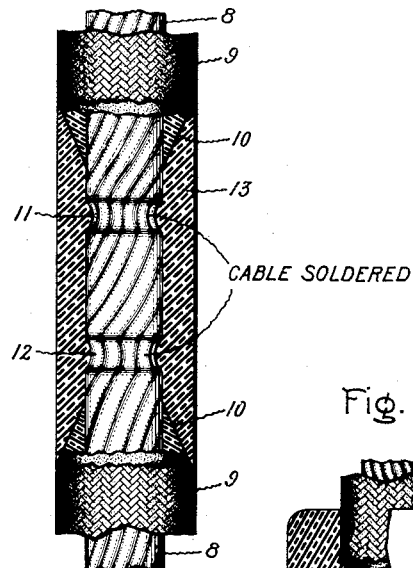

J. WILKINSON.
FILLED CABLE AND FLUID STOP.
APPLICATION FILED JUNE 2, 1917.

1,267,832.

Patented May 28, 1918.

CABLE SOLDERED

Inventor:
James Wilkinson,
by Albert G. Davis
His Attorney

UNITED STATES PATENT OFFICE.

JAMES WILKINSON, OF PITTSFIELD, MASSACHUSETTS, ASSIGNOR TO GENERAL ELECTRIC COMPANY, A CORPORATION OF NEW YORK.

FILLED CABLE AND FLUID-STOP.

1,267,832.　　　　　Specification of Letters Patent.　　Patented May 28, 1918.

Application filed June 2, 1917. Serial No. 172,527.

*To all whom it may concern:*

Be it known that I, JAMES WILKINSON, a citizen of the United States, residing at Pittsfield, in the county of Berkshire, State of Massachusetts, have invented certain new and useful Improvements in Filled Cables and Fluid-Stops, of which the following is a specification.

My invention relates broadly to stranded cables, but more particularly to those stranded electrical conductors which extend into oil or some other fluid likely to creep along the cable between the strands thereof and between the metallic parts and the insulating covering if any. One object of my invention is to provide a method of filling a portion of a stranded cable with a solidifiable fluid; the solidifiable fluid may be inserted for various purposes, some of which are indicated hereinafter. Another object of my invention is to provide a fluid stop for cables. Still a further object of my invention is to provide a combined fluid stop and carrying device for cables; in this aspect my invention may provide an insulating bushing for electrical cables applicable where cables pass through walls, as walls of tanks containing electrical apparatus to which the cables are attached.

It has heretofore been proposed to fill the interstices between the strands of a stranded cable with a solidifiable fluid, as solder. One difficulty heretofore experienced has been due to the tendency of the filling material to flow considerably farther along the cable than was necessary, both wasting filling material and unnecessarily reducing the flexibility of the cable. Difficulty has also been experienced in completely filling all the interstices of any portion of a cable, so for example, as to make the cable entirely impervious to fluid flow along the cable. By my invention both these difficulties are overcome by closely pressing the strands of the cable together at or near the points where the cable is to be filled until the filling material is solidified. Preferably the strands are compressed by locally indenting the periphery of the cable.

Where the cable is covered with an insulating material, as is usually the case with electrical conductors, the fluid stop is provided by removing the insulation over the portion of the cable to be filled, and after the strands of the cable are filled as above described, replacing the stripped insulation by an impervious insulation which so closely engages the cable as to prevent the passage of fluid over the surface of the external metal parts of the cable. In this connection I have discovered that impervious plastic insulating materials of which bakelite is an example, are particularly adapted for inclosing a solid mass of metal to prevent the flow of fluid over the surface of the metallic mass. Such material is particularly suitable for this purpose when the solid mass is peripherally indented (for example as before indicated). It is still another object of my invention therefore to provide an insulated fluid stop comprising an impervious plastic insulating material closely engaging and surrounding a solid mass of metal included in a stranded cable.

My invention will be thoroughly understood from a consideration of certain applications of it, the best embodiments I now know of, illustrated in the accompanying drawings and hereinafter described in some detail. In the drawings: Figure 1 is an elevation of a part of an insulated cable embodying my invention, a part of the insulation being in section.

Figure 2:
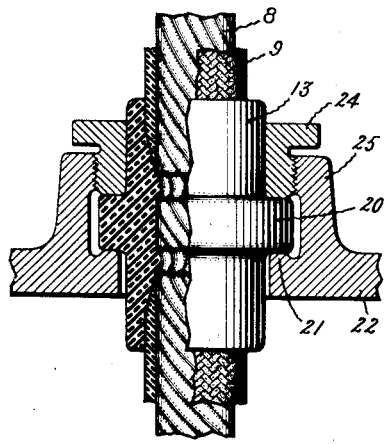
Figure 3:
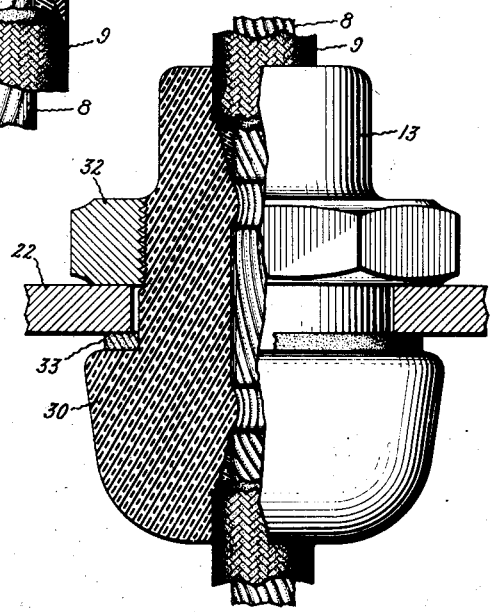
Figure 5:
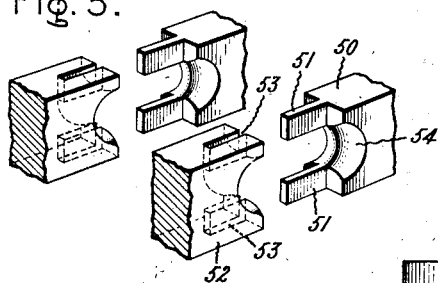

Figs. 2 and 3 are elevations also partly in section, of combined bushings and oil stops embodying my invention. Fig. 4 is an elevation again partly in section of a stranded cable provided with a terminal in accordance with my invention. Fig. 5 illustrates in elevation, two pairs of crimping jaws used for locally pressing the strands of the cable closely together in applying my invention.

In Fig. 1, the insulation 9 of the stranded cable 8 has been cut away or stripped at 10 from the portion of the cable, near the middle of the figure, in which an oil stop is provided. The cable is peripherally indented at 11 and 12 and the strands of the cable are very closely pressed together beneath the indentations. Within the part of the cable spanned by each of the indentations, the interstices between the strands are filled with solidified solder applied in a liquid form between the points 11 and 12. The interstices between the strands from adjacent the point 11 to adjacent the point 12 are more or less filled with the filling material. It will be understood that if the material of the strands of the cable 8 is such that the filling material does not readily or thoroughly adhere thereto, the strands may be tinned or otherwise treated, either during the process of manufacture of the cable or at any other later time prior to the application of the filling material, so that the solder or other filling material will adhere thereto. A bakelite cylinder 13 completely incloses the portion of the cable from which the insulation 9 has been stripped, and closely engages the solid mass or masses of metal which in this case is a combination of the cable strands and solder. The insulating material 13 extends into the indentations 11 and 12 as will be observed from the drawing. As before indicated the insulating material 13 is preferably an impervious plastic insulating material but may be some other insulation or combination of insulations which so closely engages the cable as to prevent the passage of fluid between the metal of the cable and this insulation; this insulation material ought to be substantially impervious in order to prevent the flow of a fluid through the insulation 9 and 13, external to the metallic strands of the cable, and thus complete the oil stop of the cable.

The structure of Fig. 1 may be provided in the following manner: The cable with the insulation 9 stripped at 10 as indicated in Fig. 1, is placed in the two pairs of crimping jaws illustrated in Fig. 5. Each pair of these jaws comprises a jaw 50 provided with tongues 51 and a jaw 52 provided with slots 53 to receive the tongues 51. Between the tongues 51 of the jaw 50 and between the slots 53 of the jaw 52 each jaw is recessed something like as shown at 54. These recesses 54 are of such shape and size that when the jaws 50 and 52 are brought tightly together about the strands of the cable, as for example, adjacent the point of the indentation 11 of Fig. 1, a peripheral indentation like the indentation 11 is produced in the cable and the strands of the cable are pressed tightly together beneath the indentations. After the cable is placed between the two pairs of jaws, the two pairs being so spaced as to provide the desired distance between the indentations 11 and 12, the jaws are first brought substantially only into contact with the periphery of the cable. While the cable is between the two pairs of jaws in this position, liquid solder is applied to the exterior of the cable between the two pairs of jaws and finds its way into interstices between the strands. As the solder begins to flow between the strands beyond the jaws, the members of each pair of jaws are forced tightly together, producing the indentations 11 and 12 and locally pressing the strands together within the range of flow and in the presence of some of the liquid solder. While the jaws are held in their closed positions, the supply of solder to the cable between the pairs of jaws may be continued if it is desirable or necessary, as to completely fill the interstices between the strands; little or none of the solder passes far beyond the points 11 and 12 because of the compression of the strands at these points. After sufficient solder has been applied, the cable is allowed to cool, thus solidifying the solder, and after the solder has sufficiently firmly set, the jaws are separated and the cable removed. Thereafter the insulating material 13 is added, being preferably applied in such a mold, if a plastic, as to force the material 13 into close engagement with the metal of the cable. The oil stop is then complete. This procedure may be varied in this way: The members of the two pairs of jaws are forced tightly together, producing the indentations 11 and 12, before any solder is applied. After the indentations are completed, the solder is applied and finds its way into all the interstices under the indentations and completely fills the same even though the strands are compressed so tightly as to deform the strands. After the solder is solidified, the jaws are separated and the insulation 13 applied as before. I contemplate that this method of filling will be found preferable for at least cables of the larger sizes.

In the bushing of Fig. 2 the oil stop is the same as that of Fig. 1. The insulating member 13 is provided with an external flange 20, however, to adapt it to a bushing. The flange 20 is gripped between a lip 21 on the carrying member 22 and the member 24 screw threaded into an extension 25 of the member 22. The bushing of Fig. 3 is quite similar to that of Fig. 2 except as to its outlines and as to the scheme of fastening the member 13 to the carrying member 22. In the construction of Fig. 3 the member 13 is provided with an enlarged portion 30 overhanging the edge of the aperture through the member 22 as shown. On the other side of the member 22 the inclosing member 13 is screw-threaded as shown and a coöperating nut 32 engages with the screw threads and also engages with the member 22 and attaches the cable thereto. A gasket 33 may be provided between the projecting portion 30 and the member 22 to provide an oil-tight joint or otherwise if desirable.

Figure 4:
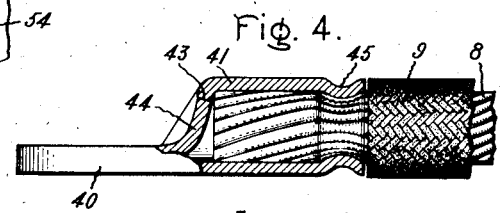

In Fig. 4 the application of my invention to attaching a terminal to a stranded cable is illustrated. The insulation is first stripped from the end of the cable as shown and the terminal 40 slipped thereover. This terminal 40 in general may be of any desirable shape comprising a tubular portion 41 of an internal diameter sufficient to receive the metallic strands of the cable as shown. The end of the tubular portion 41 opposite the cable is cut at 43 so as to provide a flap 44 which may be bent to the left to expose the interior of a tubular portion 41 and the end of the cable. With the flap 44 bent to the left and the cable end and terminal heated if necessary, solder is introduced to the interior of the tubular part 41 through the flap opening and the cable is peripherally indented adjacent the point 45 substantially as above indicated with reference to the other figures except that the tubular part 41 is indented therewith as shown in the drawing. After the tubular part 41 is sufficiently filled with solder, the flap 44 is bent back to the position shown. It will be apparent that I have provided a cable terminal which is both electrically and mechanically thoroughly attached to the cable, and the solder introduced into the tubular part 41 flows substantially only so far along the cable, that is to adjacent the cable end of the terminal, as is desirable in attaching the terminal. It may be noted that even though the terminal becomes sufficiently overheated, in service to melt and lose its solder, the cable will not easily separate from or lose contact with the terminal because of its mechanical construction.

While I have described the principle of my invention and the best mode I have contemplated for applying this principle, other modifications will occur to those skilled in this art and I aim in the appended claims to cover all modifications which do not involve a departure from the spirit and scope of my invention.

What I claim as new and desire to secure by Letters Patent of the United States, is:—

1. The method of filling a portion of a stranded cable with a solidifiable fluid which consists in supplying the solidfiable material to said portion of the cable in a fluid form while locally pressing the strands of said cable portion closely together, solidifying the inserted material, and removing the locally applied pressure.

2. The method of filling a portion of a stranded cable with a solidifiable fluid which consists in supplying the solidifiable material to said cable in a fluid form and allowing the same to flow along the cable between the strands, limiting the flow of the inserted fluid by locally pressing the strands closely together, and solidifying the material inserted.

3. The method of filling a portion of a cable with a solidifiable fluid which consists in supplying the solidifiable material in a fluid form to said cable between two adjacent points thereon where the strands of the cable are closely pressed together, solidifying the inserted material, and removing the locally applied pressure.

4. A stranded cable provided with a fluid stop comprising a portion of the cable in which the strands are closely pressed together and a solid material fills the interstices between the portions of the strands closely compressed.

5. A stranded cable provided with a fluid stop comprising a portion of the cable in which the periphery of the cable is locally indented and a solid material fills the interstices between the strands adjacent the indentations.

6. A stranded cable having an insulating covering and provided with a fluid stop comprising a portion in which the periphery of the cable is locally indented and a solid material fills the interstices between the strands and an impervious insulating material closely surrounds the cable extending into the indentation.

7. A stranded cable having an insulating covering and provided with a fluid stop comprising a portion in which the periphery of the cable is locally indented and a solid material fills the interstices between the strands and an impervious plastic insulating material closely surrounds said cable, extending into the indentation.

8. A stranded cable having an insulating covering and provided with a fluid stop comprising a portion in which the conductor is a solid mass of metal and which is inclosed in an impervious plastic insulating material closely engaging the same.

9. The combination with a stranded cable having a part thereof in which the strands are closely pressed together and a solid material fills the interstices between the strands, of an impervious insulating material closely engaging and inclosing that part of the cable, and means for carrying the cable attached to said insulating material.

10. The combination with a stranded cable having a part thereof in which the periphery of the cable is locally indented and a solid material fills the interstices between the strands, of an impervious insulating material closely engaging and inclosing that part of the cable and extending into said indentations, and means for carrying the cable attached to said insulating material.

11. A stranded cable having an insulating covering and provided with a fluid stop comprising a portion in which the conductor is a solid mass of metal indented peripherally, and which is inclosed in an impervious plastic insulating material closely engaging the same and extending into the indentation.

12. A stranded cable provided with a fluid stop comprising a portion of the cable in which the strands are locally closely pressed together at two adjacent points and a solid material fills the interstices between the strands adjacent said two points.

13. A stranded cable having an insulating covering and provided with a fluid stop comprising a portion in which the periphery of the cable is locally indented at two adjacent points and a solid material fills the interstices between the strands adjacent said two points and an impervious insulating material closely surrounds the cable between said two points.

In witness whereof, I have hereunto set my hand this 26th day of May, 1917.

JAMES WILKINSON.